Figures 1, 2, 3:
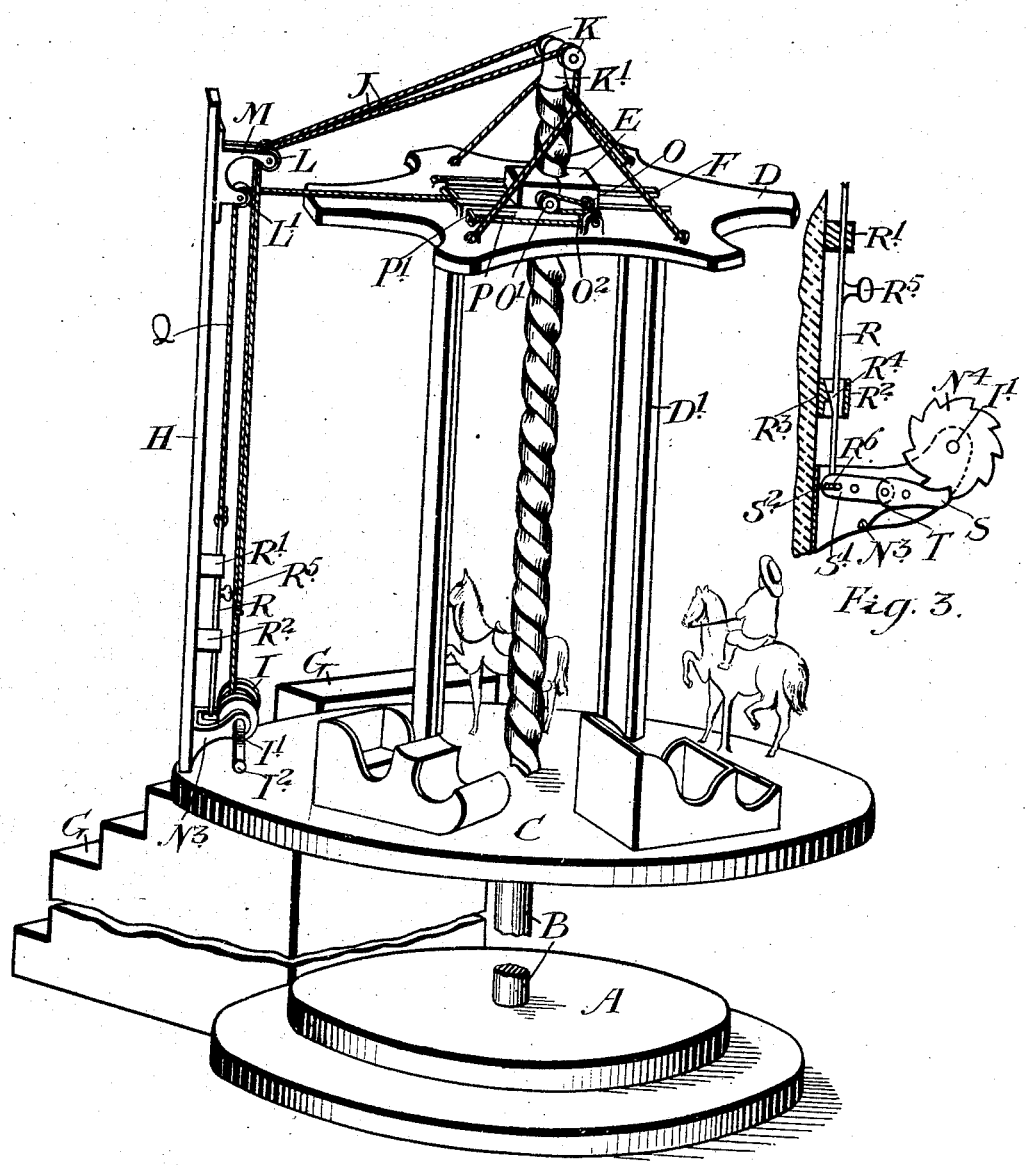

No. 840,790. PATENTED JAN. 8, 1907.
E. J. MITCHESON.
MERRY-GO-ROUND.
APPLICATION FILED APR. 14, 1906.

Witnesses.

Inventor.
E. J. Mitcheson

UNITED STATES PATENT OFFICE.

ERNEST JAMES MITCHESON, OF TORONTO, ONTARIO, CANADA.

MERRY-GO-ROUND.

No. 840,790.  Specification of Letters Patent.  Patented Jan. 8, 1907.

Application filed April 14, 1906. Serial No. 311,733.

*To all whom it may concern:*

Be it known that I, ERNEST JAMES MITCHESON, of the city of Toronto, in the county of York, in the Province of Ontario, Canada, have invented certain new and useful Improvements in Merry-Go-Rounds, of which the following is the specification.

My invention relates to improvements in merry-go-rounds; and the object of the invention is to devise a simple apparatus of this class which will automatically revolve for a predetermined period without manual aid or movement of any engine to produce said motion; and it consists, essentially, of a suitable base provided with a central screw-standard, a circular platform provided with the usual wooden animals or carriages to carry persons, a canopy supported in standards on the same and having a nut, preferably expansible, provided with a thread to correspond to the thread of the screw or spiral standard, and means for expanding and closing such nut around the standard and for raising the circular platform and canopy to the desired height previous to starting it revolving, as hereinafter explained.

Figure 1 is a perspective view showing my merry-go-round complete. Fig. 2 is a detail of the expansible nut. Fig. 3 is a detail of the reel-controlling mechanism.

In the drawings like letters of reference indicate corresponding parts in each figure.

A is the base of the merry-go-round, of any suitable form, and B is the central standard, having a spiral or screw thread of a comparatively long pitch.

C is the circular platform, upon which are secured the animals and carriages ready to be occupied.

D is the canopy or covering, supported upon the platform C by standards D′.

E is an expansible divided nut which is normally designed to be held apart by the side expansion-springs E′, located in the opposing recesses E², made at each side of the division. The expansible nut E has a central orifice threaded to fit the screw-standard. The expansible nut E is held in suitable guideways F on top of the canopy D.

G is a flight of steps whereby passengers may ascend to the platform when in its raised position.

H is an upright secured to the edge of the circular platform C, and I is a reel journaled in suitable bearings fastened to the standard.

J represents wire ropes secured to the top of the canopy and passing over pulleys K on the swiveled top K′ of the standard B, thence to pulleys L, journaled in bearings M at the top of the upright H. The ropes J extend down to a short distance from the reel I, where they are connected together and extend as one rope around the reel I, which is provided with a shaft I′, having a crank-handle I², such shaft being journaled in brackets N³, attached to the upright H. One end of the reel I is provided with a ratchet-wheel N⁴. (See Fig. 3.)

O represents pins secured to one end of the divided nut E, and O′ represents pulleys journaled on pins on the opposite side of the divided nut.

O² represents pulleys journaled in suitable bearings on the top of the canopy.

P is a rope fastened to the pin O, passing around the pulleys O′ and O² and extending to the cross-bar P′, which projects through the slots F′ in the guideways F.

Q is a rope connected to the center of the cross-bar P′ and extending therefrom to and over a pulley L′, journaled in the bearing-bracket M, thence to a pull-bar R, held in the brackets R′ and R², attached to the standard H. The bracket R² has an enlarged opening provided with a pawl-shaped tooth R³ at the inside, which is designed to be engaged by a ratchet-shaped tooth R⁴, forming part of the bar R. The bar R is provided with a manipulating-knob R⁵.

S is a lever-pawl pivoted on the bracket N³ and engaging at one end with the ratchet-wheel N⁴.

S′ is a lever pivotally connected to the free end of the lever-pawl S and having a slot S², into which extends the pin R⁶, attached to or forming part of the pull-bar R.

T is a spring secured at one end to the bracket N³ and having the other end pressing against the lever-pawl S with a normal tendency to hold the pawl-shaped end in engagement with the ratchet-wheel N⁴.

To raise the platform and canopy freely upward on the central screw-standard B, it is simply necessary for any person standing on the platform A to turn the crank-handle I², when the platform will ascend the standard to the desired height, which will be when fully raised level with the top of the steps G. It will of course be understood that the nut E will at this time be open, so that it does not engage the thread, but slides freely up over the center of the standard B. The pawl S as the reel winds up the rope J to raise the platform holds the platform in the position into which it is raised. Immediately the platform has been raised to the desired height the knob $R^5$ is pulled downwardly, and as the pull-bar is a spring-bar the tooth $R^4$ will engage with the tooth $R^3$. At the same time the lever $S^2$ is tilted on its pivot, so that as soon as the teeth $R^3$ and $R^4$ are engaged the lever-pawl S will have passed out of the teeth of the ratchet-wheel $N^4$. The platform C now is held on the standard B by the nut alone, and necessarily such platform will descend of its own gravity and rotate in its descent, thereby giving a circular sinking motion. It will be understood that the pull-bar R will be manipulated as soon as the passengers have taken their seat on the merry-go-round.

What I claim as my invention is—

1. In a merry-go-round, the combination with the base and the central standard secured in the same and having a spiral thread, of a circular platform having figures or the like circularly arranged on same, and a central aperture through which the standard extends, and a canopy located above the platform, and standards rigidly connecting the canopy and platform together, the said canopy having also an aperture through which the spiral standard extends and serving to maintain the platform from wabbling as it rotates as specified, said canopy being adapted to be lifted by hand to draw the platform upwardly on the spiral standard together with itself.

2. The combination with the base and screw-standard and platform, and a divided nut suitably supported on the platform, a swivel top for the standard provided with pulleys, ropes connected to the platform and extending over the pulleys, an upright also connected to the platform and provided with pulleys through which such rope will extend, and a reel journaled in the bottom of the upright and to which the lower ends of the ropes are connected and a ratchet-wheel secured to the end of the reel and engaged by a pawl as and for the purpose specified.

3. The combination with the base and screw-standard and platform and divided nut suitably supported on the platform, a swivel top for the standard provided with pulleys, ropes connected to the platform and extending over the pulleys, an upright also connected to the platform and provided with pulleys through which such ropes extend, a reel journaled in the bottom of the upright and to which the lower ends of the ropes are connected, a ratchet-wheel secured to the end of the reel and engaged by a pawl and means for throwing the nut apart when manipulating the reel as and for the purpose specified.

4. In combination, a base, a suitable screw-standard, a platform, a canopy supported on the platform, a divided nut located centrally on the canopy, guideways for the same, springs having a normal tendency to hold the divided nut apart, pins on one portion of the divided nut and pulleys on the other portion, pulleys on the canopy, a rope connected to the pins of one portion of the divided nut and extending over the pulleys aforesaid, a cross-bar to which the ropes are connected extending through slots in the guideways, a rope connected to the center of such bar and extending over the pulleys on the upright, a pull-bar located at the lower end of such rope and having a tooth thereon, suitable brackets in which such pull-bar is supported, the lower one of which is provided with a tooth, ropes connected to the upper end of the canopy, a swiveled top for the screw-standard provided with pulleys over which such ropes extend, an upright secured to the platform and provided with a bearing-bracket pulleys over which the raising-ropes extend, a spring-pressed lever-pawl engaging such ratchet-wheel, a lever pivotally connected to one end of the lever-pawl and to the lower end of the pull-bar as and for the purpose specified.

ERNEST JAMES MITCHESON.

Witnesses:
B. ROBINSON,
E. McEACHERN.